A. A. BULL.
RAIL JOINT.
APPLICATION FILED OCT. 7, 1916.
1,252,392. Patented Jan. 8, 1918.
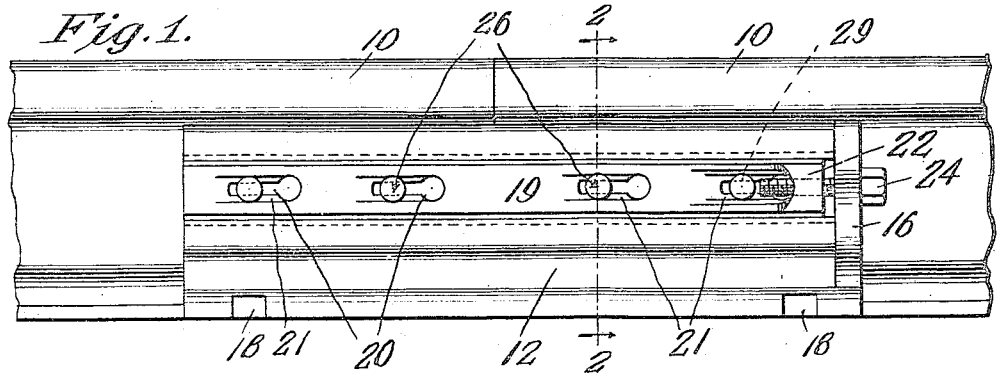
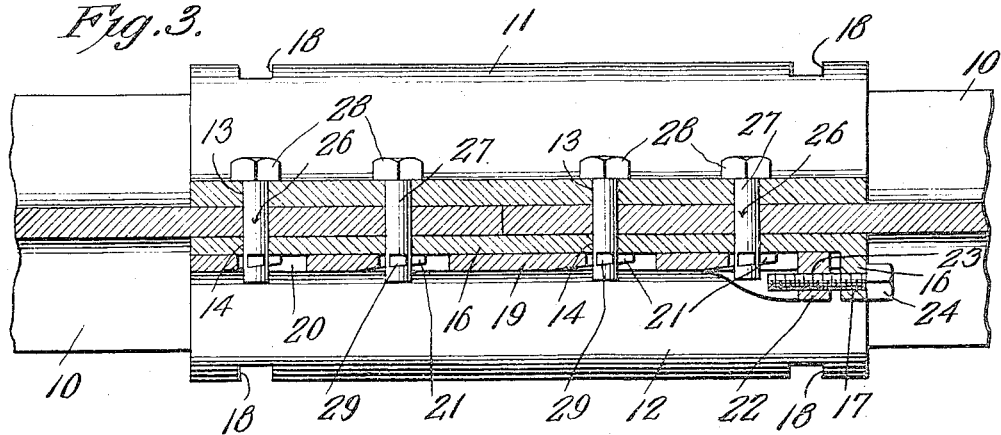
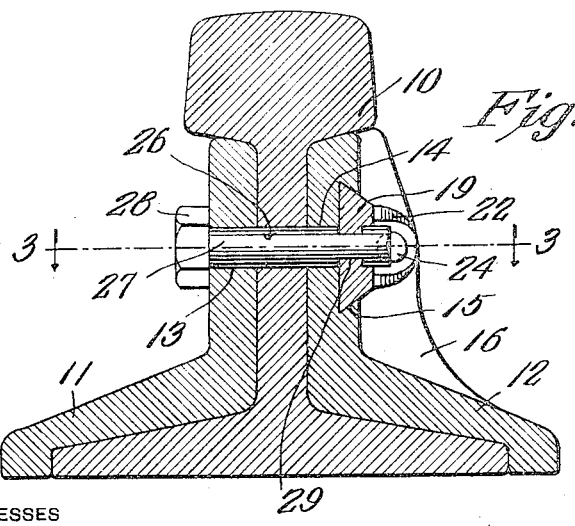
INVENTOR
Archer A. Bull,
BY
ATTORNEY

UNITED STATES PATENT OFFICE.

ARCHER A. BULL, OF SPRING CREEK, PENNSYLVANIA.

RAIL-JOINT.

1,252,392. Specification of Letters Patent. Patented Jan. 8, 1918.

Application filed October 7, 1916. Serial No. 124,379.

*To all whom it may concern:*

Be it known that I, ARCHER A. BULL, a citizen of the United States, residing at Spring Creek, in the county of Warren and State of Pennsylvania, have invented certain new and useful Improvements in Rail-Joints, of which the following is a specification.

This invention relates to rail joints and the object of the same resides in the production of an improved means for connecting the meeting ends of rails without the use of nutted bolts, thus obviating the many objectionable features of rail joints of that type.

Another object of this invention is to provide a rail joint of the kind above described that is simple in construction, efficient in operation and consists of the minimum number of parts.

With these and other objects in view, this invention consists of certain novel constructions, combinations and arrangement of parts, as will be hereiafter fully described and claimed.

In the accompanying drawings:—

Figure 1 is a front elevational view of the improved device applied to the meeting ends of rails.

Fig. 2 is a sectional view taken on line 2—2 of Fig. 1, and

Fig. 3 is a sectional view taken on line 3—3 of Fig. 2.

Referring to the parts by reference numerals, the rails are designated by the numeral 10 and the fish plates comprising the improved joint by the numerals 11 and 12. The fish plate 11 is of the ordinary construction having a series of bolt hole openings 13 formed therein while the fish plate 12 has a plurality of bolt hole openings 14 formed therein and also a longitudinally extending groove 15, the said groove being undercut for a purpose to be hereinafter set forth. One end of the fish plate 12 is provided with an angularly extending plate 16 having an unthreaded opening 17 formed therein for a purpose to be hereinafter set forth.

Both of the fish plates 11 and 12 have the ordinary cut out portions 18 formed therein for the reception of rail spikes.

Associated with the fish plates of the type above set forth is a strip 19 adapted to be inserted in the under cut groove 15 in the fish plate 12, the said strip having formed therein at uniformly spaced intervals the keyhole openings 20 and adjacent the longitudinal edges of the slots 20 are provided the inclined ledges 21 for a purpose to be later set forth. Adjacent one end of the strip 19 is an enlargement 22 having a threaded opening 23 formed therein, the said opening 23 being adapted to be alined with the opening 17 in the angularly extending plate 16 on the fish plate 12 and an adjusting screw 24 is threaded through these alined openings to control the movement of the strip 19 in the groove 15.

Bolts 26 are provided with this device having the ordinary elongated shanks 27 and a polygonal head 28 at one end thereof and at the opposite end on each of the shanks 27 is provided a second head 28 formed by the grooves 29. These bolts 26 are adapted to pass through the openings 13 in the fish plate 11 and suitable openings formed in the rails 10 and also through the keyhole opening 20 in the strip 19. It is of course to be understood that when these bolts are passed through the keyhole openings they are inserted through the enlarged portion at one end thereof. After the bolts have been inserted through the enlarged portions of the keyhole opening the adjusting screw 24 is passed through the openings 17 and 23 and the strip 19 is moved toward the angularly extending plate 16 and obviously the bolts are positioned in the reduced portion of each of the keyhole openings 20 and in that the heads 28 on the bolts are of such size as to prevent the withdrawal of the same through the reduced portions of the keyhole openings it is impossible to withdraw the same until the strip 19 is moved to position the bolts in the enlarged ends of the openings. When the strip 19 is positioned as shown in the accompanying drawings the grooves 29 in the bolts 26 are so arranged as to permit the engagement of the inclined ledges 21 with the inner faces of the heads 28 and thus as the strip 19 is moved toward the plate 16 the heads 28 are wedged in a position as shown in the accompanying drawings.

It is obvious that minor changes may be made in the form and construction of this invention without departing from the material parts thereof. It is therefore not wished to confine the invention to the exact form herein shown and described, but it is wished to include all such as come within the scope claimed.

What is claimed is:—

1. In a rail joint, the combination with a pair of rails having openings therein, a pair of fish plates on said rails having openings therein to register with said openings in said rails, one of said fish plates having a longitudinally extending undercut groove therein, an angularly extending plate at one end of said last mentioned fish plate, a strip having a plurality of keyhole openings slidable in said groove, inclined ledges adjacent said keyhole openings, bolts passing through said alined openings and through said keyhole slots having grooves therein to provide abutment heads and means passing through said angularly extending plate and into engagement with said strip to move said strip in said groove to position the abutment heads of said bolts on said ledges to prevent the accidental removal of said bolts.

2. In a rail joint, the combination with a pair of rails having openings therein, a pair of fish plates on said rails having openings therein to register with said openings in said rails, a plate having a plurality of key hole openings formed therein slidably mounted in one of said fish plates, inclined ledges adjacent said keyhole openings, means passing through said alined openings and said keyhole openings, having a portion thereof adapted for engagement with said ledges, and means for moving said strip to engage said first mentioned means on said ledges as and for the purpose set forth.

In testimony whereof I affix my signature in presence of two witnesses.

ARCHER A. BULL.

Witnesses:
 ROBT. DONALDSON,
 G. W. DONALDSON.

Copies of this patent may be obtained for five cents each, by addressing the "Commissioner of Patents, Washington, D. C."